(12) United States Patent
Hatae

(10) Patent No.: US 6,771,936 B2
(45) Date of Patent: *Aug. 3, 2004

(54) APPARATUS AND METHOD FOR WIRE OR RADIO TRANSMISSION INFORMATION SIGNAL PROCESSING

(75) Inventor: Shinichi Hatae, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,730

(22) Filed: Sep. 14, 1999

(65) Prior Publication Data

US 2002/0065092 A1 May 30, 2002

Related U.S. Application Data

(62) Division of application No. 08/718,863, filed on Sep. 24, 1996, now Pat. No. 5,970,392.

(30) Foreign Application Priority Data

Sep. 26, 1995 (JP) ............................................. 7-247684

(51) Int. Cl.[7] ................................................ H04B 7/00
(52) U.S. Cl. ........................ 455/66.1; 455/59; 455/74.1; 455/344
(58) Field of Search ............................ 455/41, 93, 95, 455/133, 8, 49, 50, 277, 278, 53.1, 54.1, 54.2, 450, 452, 66.1, 39, 59, 103, 277.1, 344, 74.1; 370/321, 347, 545, 322, 326

(56) References Cited

U.S. PATENT DOCUMENTS

| | | | |
|---|---|---|---|
| 3,513,443 A | | 5/1970 | Andersen |
| 4,686,490 A | | 8/1987 | Cressey ........................ 455/93 |
| 4,912,773 A | | 3/1990 | Schiff .......................... 455/103 |
| 5,054,112 A | * | 10/1991 | Ike ............................... 455/41 |
| 5,125,021 A | | 6/1992 | Lebowitz ...................... 379/59 |
| 5,193,222 A | | 3/1993 | Sasaki ......................... 455/103 |
| 5,239,540 A | | 8/1993 | Rovira et al. ................. 455/66 |
| 5,526,399 A | * | 6/1996 | Kameda ...................... 379/58 |
| 5,579,337 A | | 11/1996 | Grinstein et al. |
| 5,640,392 A | * | 6/1997 | Hayashi ...................... 370/395 |
| 5,689,244 A | * | 11/1997 | Iijima et al. .......... 340/825.07 |
| 5,757,785 A | * | 5/1998 | Sugihara ..................... 370/321 |
| 5,768,312 A | * | 6/1998 | Imamura .................... 375/228 |
| 5,835,498 A | * | 11/1998 | Kim et al. ................... 370/537 |
| 5,915,127 A | * | 6/1999 | Ogawa et al. .............. 395/878 |
| 5,970,392 A | * | 10/1999 | Hatae .......................... 455/66 |
| 6,122,280 A | * | 9/2000 | Hamai et al. ............... 370/395 |
| 6,138,196 A | * | 10/2000 | Takayama et al. .......... 710/105 |

* cited by examiner

Primary Examiner—Sonny Trinh
(74) Attorney, Agent, or Firm—Fitzpatrick, Cella, Harper & Scinto (57) ABSTRACT

Communication of a device by controlling a wire communication interface to receive a bit stream from an external device via a wire transmission line, controlling a radio communication interface to receive a bit stream from an external device via a radio transmission line, and controlling the wire communication interface to transfer the bit stream received by the wire communication interface to another external device via the wire transmission line and to transfer the bit stream received by the radio communication interface to another external device via the wire transmission line. Additionally, the wire communication interface may be controlled to transfer the bit stream to an external device via a wire transmission line using an isochronous transfer mode.

16 Claims, 7 Drawing Sheets

APPARATUS AND METHOD FOR WIRE OR RADIO TRANSMISSION INFORMATION SIGNAL PROCESSING

This application is a division of application Ser. No. 08/718,863, filed Sep. 24, 1996 now U.S. Pat. No. 5,970,392.

BACKGROUND OF THE INVENTION

1. Field of the Invention

The invention relates to information signal processing apparatus and method for transmitting and receiving an information signal.

2. Related Background Art

Hitherto, when a plurality of digital information equipment are connected and digital data is serially transmitted, a system according to a wire transmission based on, for example, the SMPTE 125M standard or IEEE 1394 standard is proposed.

In the SMPTE 125M, however, when a plurality of equipment are connected, it is necessary to provide a distributor for one equipment. Since a bidirectional communication is not performed, an individual transmission and reception line needs to be provided for each equipment. Although a connection of (1:1) of the equipment can be easily realized, a hardware increases, its treatment is inconvenient, and costs rise.

In the IEEE 1394, each equipment cannot be connected to a position 4.5 m. or more away from another equipment. When a communication at a remote distance is executed, it is necessary to connect a number of equipment each having a repeater function. According to the connection by wire as mentioned above, a wiring process of a large quantity of wire material is needed and a degree of freedom in a system construction is restricted.

SUMMARY OF THE INVENTION

Under such circumstances as mentioned above, it is an object of the invention to provide information signal processing apparatus and method which can easily connect a plurality of information equipment installed at remote distances by selectively transmitting an information signal by wire or in a radio manner.

To accomplish the above object, according to one preferred embodiment, there is provided an information signal processing apparatus (method) comprising: converting means (step) for converting an information signal which is inputted into a transmission signal in a predetermined form; wire transmitting means (step) for transmitting the transmission signal converted by the converting means (step) to a transmission line; radio transmitting means (step) for transmitting the transmission signal converted by the converting means (step) in a radio manner; and selecting means (step) for selecting either the wire transmission or the radio transmission.

According to another preferred embodiment, there is provided an information signal processing apparatus (method) comprising: wire receiving means (step) for receiving an information signal in a predetermined form through a transmission line; radio receiving means (step) for receiving the information signal transmitted in a radio manner by modulating the information signal in the predetermined form; selecting means (step) for selecting either the wire reception or the radio reception; and reproducing means (step) for reproducing the information signal of the predetermined form selected by the selecting means (step).

Other objects, features and advantages of the invention will become apparent from the following detailed description taken in conjunction with the accompanying drawings.

DETAILED DESCRIPTION OF THE PREFERRED EMBODIMENTS

Embodiments according to the invention will now be described hereinbelow.

Figure 1:
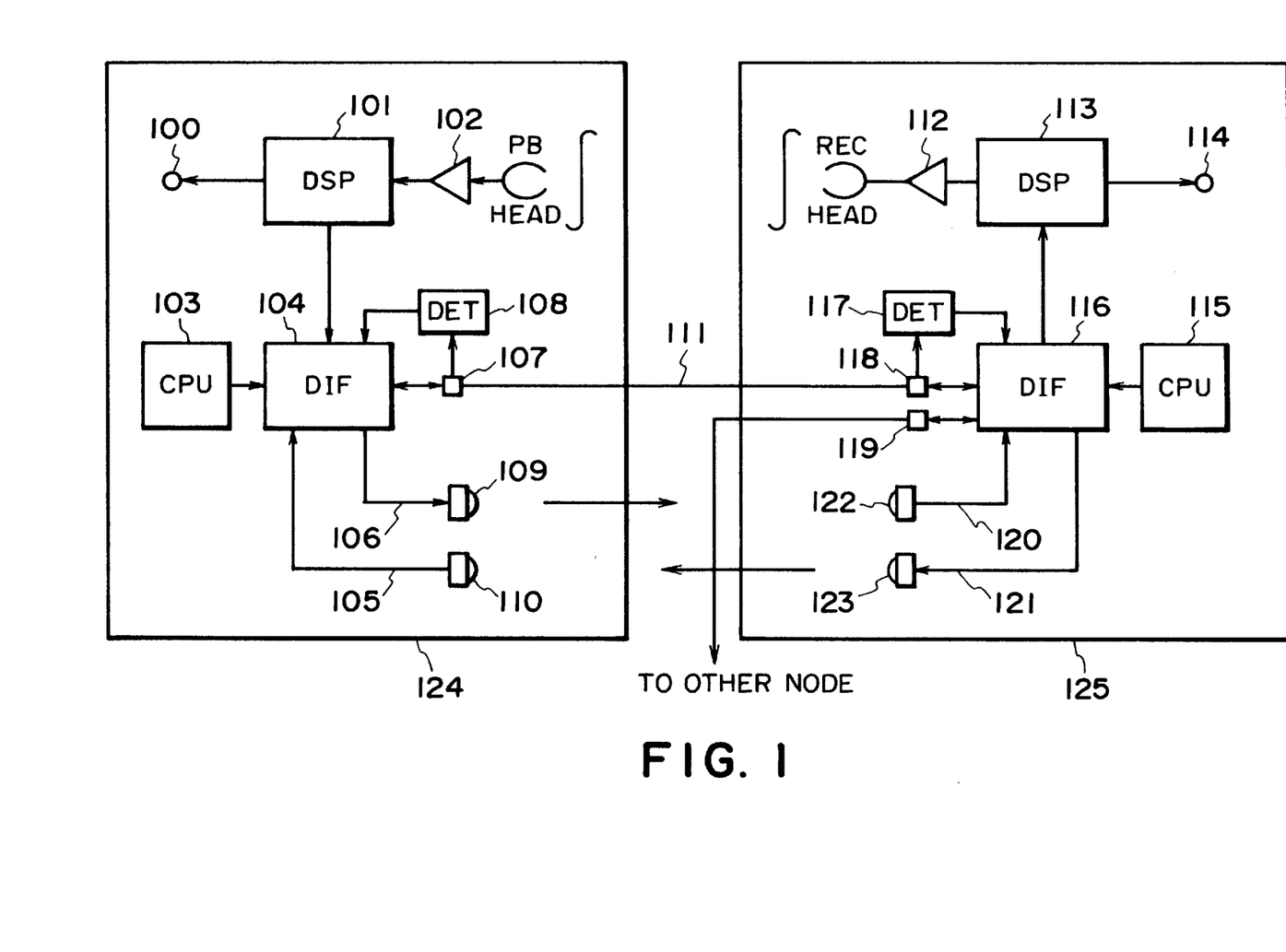
FIG. 1 is a block diagram showing a construction of a digital signal processing system according to the invention.

FIG. 1 is a block diagram showing a construction of a digital signal processing system according to the invention.

According to the digital signal processing system of FIG. 1, two digital information recording and reproducing apparatuses (hereinafter, referred to as SD (standard digital) VTRs) 124 and 125 are used as digital information equipment and a digital signal reproduced by the SDVTR 124 is transmitted to the SDVTR 125 by wire or in a radio manner and is recorded.

Figure 2A:
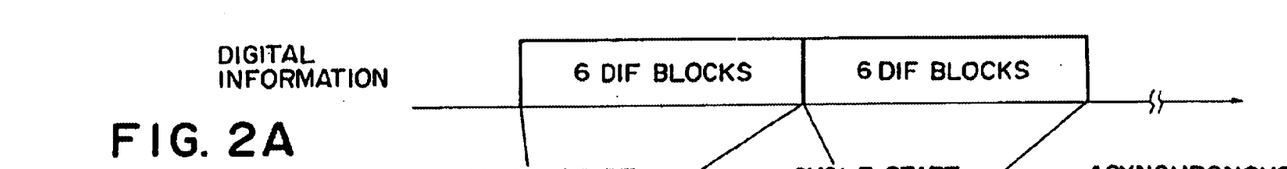
FIGS. 2A to 2C are diagrams showing a transmission example of a packet of a digital signal in the system of FIG. 1.
Figure 2B:
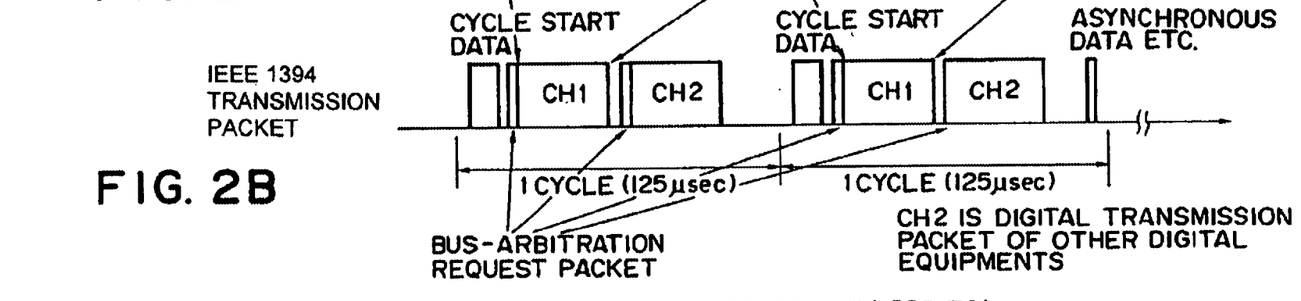
Figure 2C:
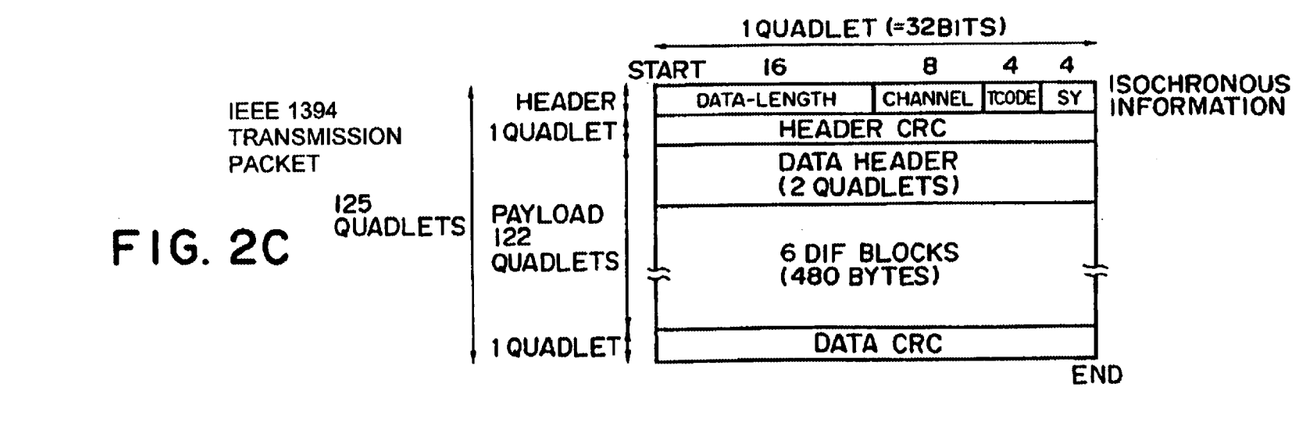

FIGS. 2A, 2B, and 2C are diagrams showing a transmission example of a packet of the digital signal in the system of FIG. 1.

FIG. 2A shows digital information data obtained by a method whereby encoded information data (for example, encoded image data) recorded on a track of a magnetic tape of the SDVTR is divided into DIF blocks and is converted into a bit stream on a unit basis of six DIF blocks. The digital information data is serially transmitted.

Figure 3:
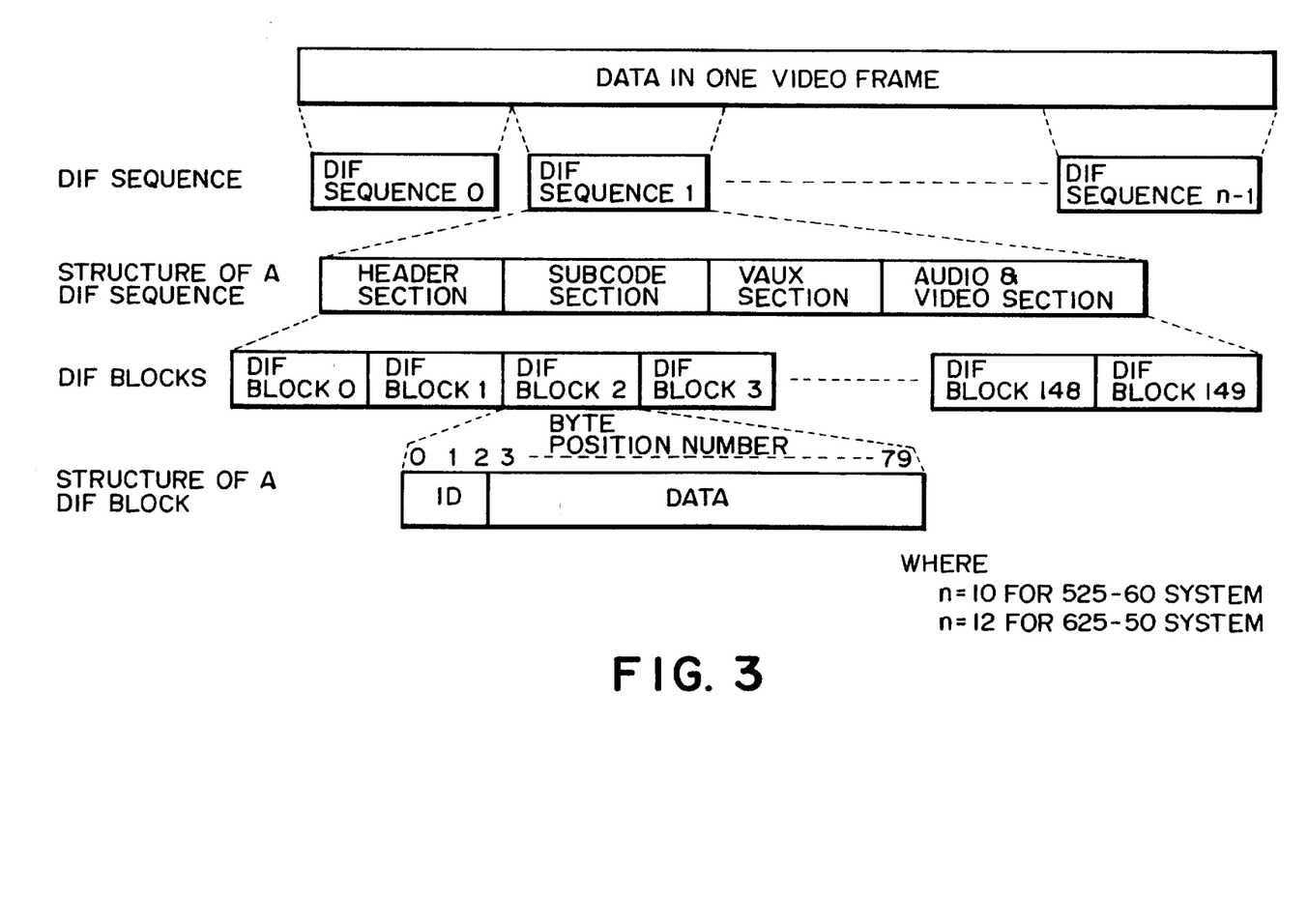
FIG. 3 is a diagram showing a construction of a DIF block.

FIG. 3 shows a construction of the DIF block. One DIF block is constructed by 3 bytes of an ID portion and 77 bytes of a data portion.

Encoded image data recorded on a magnetic tape of the SDVTR is data obtained by a method whereby an inputted image signal is A/D converted and divided into (8×8) pixel blocks and the image data divided into the blocks is subjected to an orthogonal transformation [discrete cosine transform (DCT)], is quantized, and is Huffman encoded.

FIG. 2B shows a transmission pattern in a physical layer of the IEEE 1394. In FIG. 2B, ch1 and ch2 denote DIF blocks from different nodes. In an Isochronous transmission of each block, a bus-arbitration is requested to a bus-manager and data is sequentially transmitted.

The physical layer of the IEEE 1394 determines an encoding method of a serial signal and an electrical specification of the signal. Specific roles are as follows.

(1) When a power source is turned on or a new apparatus is connected or when the apparatus is disconnected, a system construction is automatically set.

(2) A bus arbitration is executed.

(3) A situation of traffic is informed to the whole bus. A signal sent from a certain port is also certainly informed to another port.

The Isochronous transmission is a transmission in which a data transfer is completed within a predetermined time. A transmitting procedure of the Isochronous itself is omitted here.

FIG. 2C shows a packet of the IEEE 1394. The packets are sequentially read out from Start to End and a bit stream is formed.

In FIG. 2C,

Data_length: Specifies the length of the data field of the isochronous packet in bytes.

Channel: Specifies the isochronous channel number for the packet.

Tcode: Specifies the packet format and the type of transaction that shall be performed.

Sy: Application-specific control field.

Returning to the explanation of FIG. 1, in the SDVTR 124 on the transmitting side, the encoded information data reproduced from the magnetic tape by a reproducing head (PB HEAD) is transmitted through a reproducing amplifier 102 and is processed by DSP unit 101. The information data subjected to predetermined processes in the DSP unit 101 is outputted from an output terminal 100 and is also sent to a DIF unit 104 on a unit basis of six DIF packets.

In a wire mode, the information data which was processed and packetized as will be explained hereinlater in the DIF unit 104 is outputted from an input/output terminal 107 of the IEEE 1394 as shown in FIG. 2B mentioned above. In a radio mode, the bit stream data taken out from the front stage of a data/strobe modulator in the DIF unit 104 is transmitted from a radio transmitting unit 109 through a transmission line 106.

A cable 111 by the IEEE 1394 is connected between the input/output terminal 107 of the SDVTR 124 and an input/output terminal 118 of the SDVTR 125. Detectors 108 and 117 detect the connection of the cable 111 and notify the DIF units 104 and 116.

In the SDVTR 125 on the receiving side, the signal received at the input/output terminal 118 of the IEEE 1394 through the cable 111 or the information data received through a transmission line 120 from a radio receiving unit 122 is processed and packetized by a control of a CPU 115 in a DIF unit 116.

The packetized information data is sent to another node (equipment) from another output terminal 119 of the IEEE 1394 and is also sent to a DSP unit 113. The information data subjected to predetermined processes in the DSP unit 113 is outputted from an output terminal 114 and is also recorded onto the magnetic tape by a recording head (REC HEAD) through a recording amplifier 112.

It will be obviously understood that the SDVTR 125 may be set to the transmitting side and the SDVTR 125 may be set to the receiving side. In this case, the signal processed by a DIF unit 116 is transmitted from a radio transmitting unit 123 through a transmission line 121 and is received by a radio receiving unit 110 and is sent to the DIF unit 104 through a transmission line 105. Or, the signal processed by the DIF unit 116 is received at the input/output terminal 107 from the input/output terminal 118 through the cable 111 and is sent to the DIF unit 104.

Figure 4:
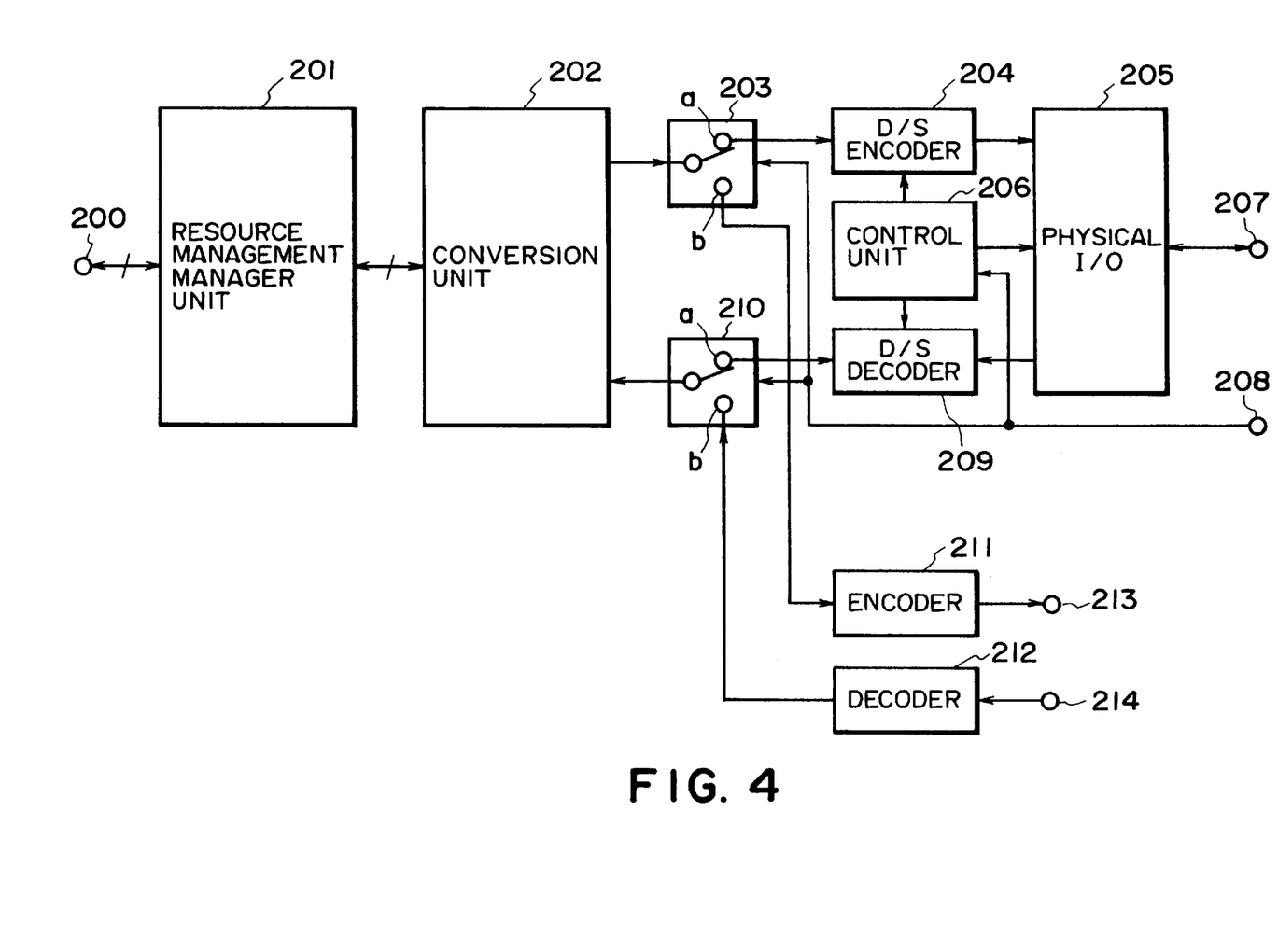
FIG. 4 is a detailed block diagram of DIF units 104 and 116 in FIG. 1.

FIG. 4 is a detailed block diagram of the DIF unit 104 or 116 in FIG. 1.

Upon transmission, in the wire mode, a control signal is inputted to a control terminal 208 by a CPU 103 or 115 in FIG. 1, so that a switch 203 is connected to the (a) side. The information data as parallel data inputted from an input/output terminal 200 is subjected to a packetization necessary for the IEEE 1394 shown in FIG. 2C by a resource management manager unit 201.

The packetized signal is converted into serial data by a P/S and S/P conversion unit 202. After that, the serial data is inputted to a data/strobe encoder (D/S encoder) 204 through the switch 203. The bit stream data is modulated into a digital signal and a strobe signal. After that, the data/strobe signals are outputted from an input/output terminal 207 through a physical layer (I/O) 205 by the IEEE 1394.

Processes in the D/S encoder 204 will now be described in detail.

In the IEEE 1394, an encoding method called a DS Link (Data/Strobe Link) is used.

Figure 5:
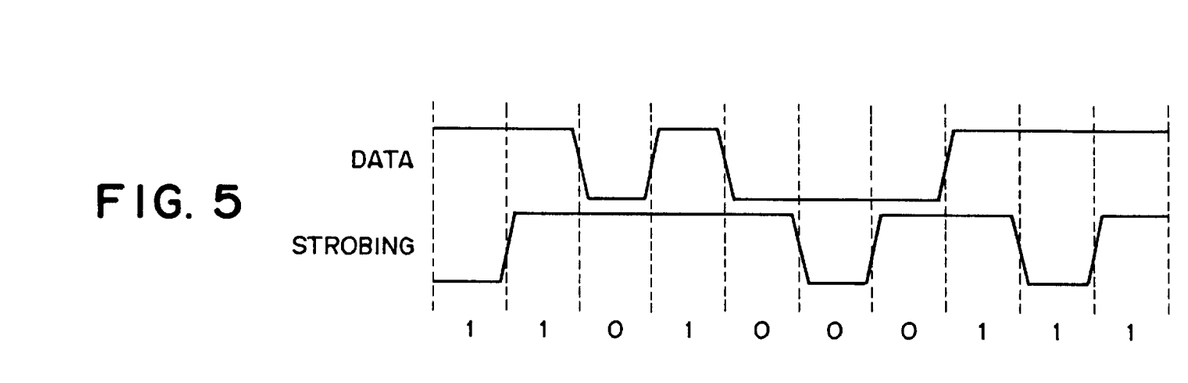
FIG. 5 is a diagram for explaining a DS Link method.

In the DS Link, two signal lines are necessary. One of the signal lines is used as a data signal line and the other is used as a strobe signal line. When the data of the same value is continuously transmitted, a state of the strobe signal changes. When the value of the data changes, the state of the strobe signal is not changed (refer to FIG. 5).

In the radio mode, the switch 203 is switched to the (b) side. The bit stream from the conversion unit 202 is modulated by an encoder 211 through the switch 203. After that, it is transmitted from a transmission terminal 213 through the radio transmitting unit 109 or 123 in FIG. 1.

The radio transmitting unit 109 or 123 converts the input data into a transmission frequency signal having a proper center frequency and transmits.

The embodiment uses a spread spectrum communication as a radio communication. According to the spread spectrum communicating method, a base band signal having a band width that is much wider than that of the original data is produced by using diffusion code series such as a pseudo noise code or the like from a base band signal of a digital signal which is ordinarily transmitted. Further, a modulation such as PSK (phase shift keying), FSK (frequency shift keying), or the like is executed and the transmission signal is converted into an RF (radio frequency) signal and is transmitted. In the embodiment, a code division multiplexing method is used in order to enable a high speed transmission of data by the spread spectrum communication.

Figure 6:
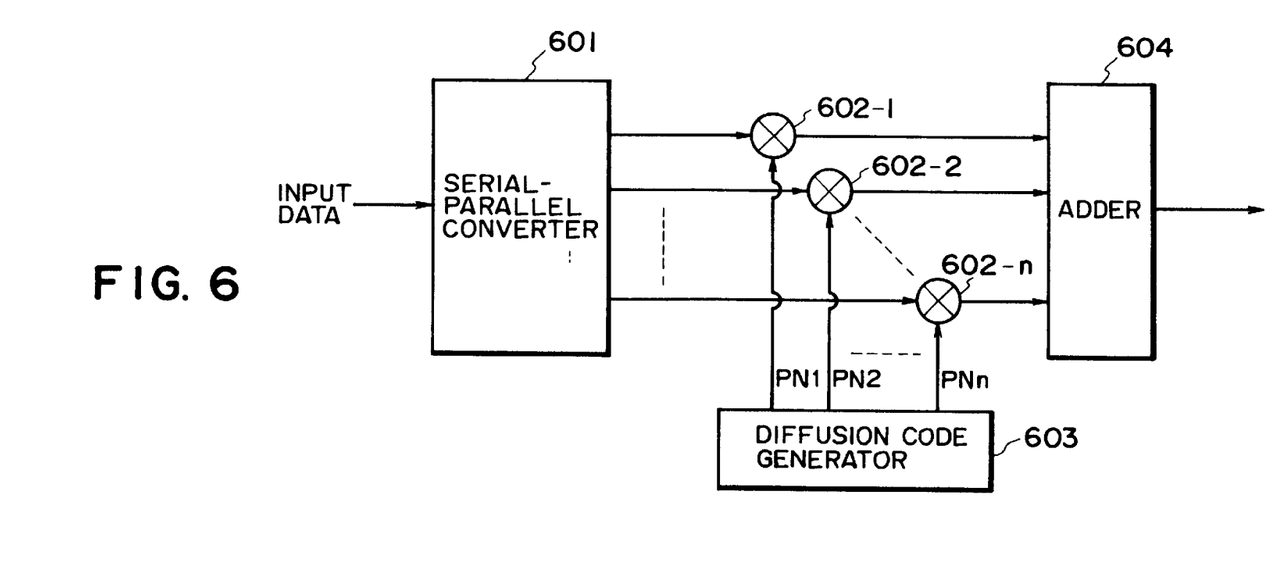
FIG. 6 is a detailed block diagram of an encoder 211 in FIG. 4.

FIG. 6 shows a specific construction of the encoder 211. In FIG. 6, reference numeral 601 denotes a serial/parallel converter; 602-1 to 602-n multipliers; 603 a diffusion code generator; and 604 an adder.

The operation of the encoder 211 constructed as mentioned above will now be described.

The information data inputted to the encoder 211 is converted into (n) parallel data by the S/P converter 601. In the (n) multipliers 602-1 to 602-n, the converted data is multiplied to (n) different diffusion code outputs generated from the diffusion code generator 603 and is converted into wide band diffusion signals of (n) channels, respectively. Outputs of the multipliers are added by the adder 604 and the result is outputted.

The resource management manager unit 201 and conversion unit 202 execute a bidirectional communication and are also used upon reception. Namely, at the time of the reception, in the wire mode, a switch 210 is connected to the (a) side by a control signal. A digital signal which is inputted from the input/output terminal 207 and comprises the data signal and strobe signal is demodulated by a D/S decoder 209 through the physical I/O 205. The demodulated signal is converted into parallel data by the conversion unit 202 through the switch 210. After that, processes such that the data is depacketized and the like are executed by the resource management manager unit 201 and the resultant data is outputted from the input/output terminal 200.

In the radio mode, the switch 210 is switched to the (b) side. The digital signal received by the radio receiving unit 110 or 122 in FIG. 1 is received at a reception terminal 214 and is demodulated by a decoder 212. After that, the demodulated signal is sent to the conversion unit 202 through the switch 210. The subsequent processes are executed in a manner similar to those mentioned above.

Figure 7:
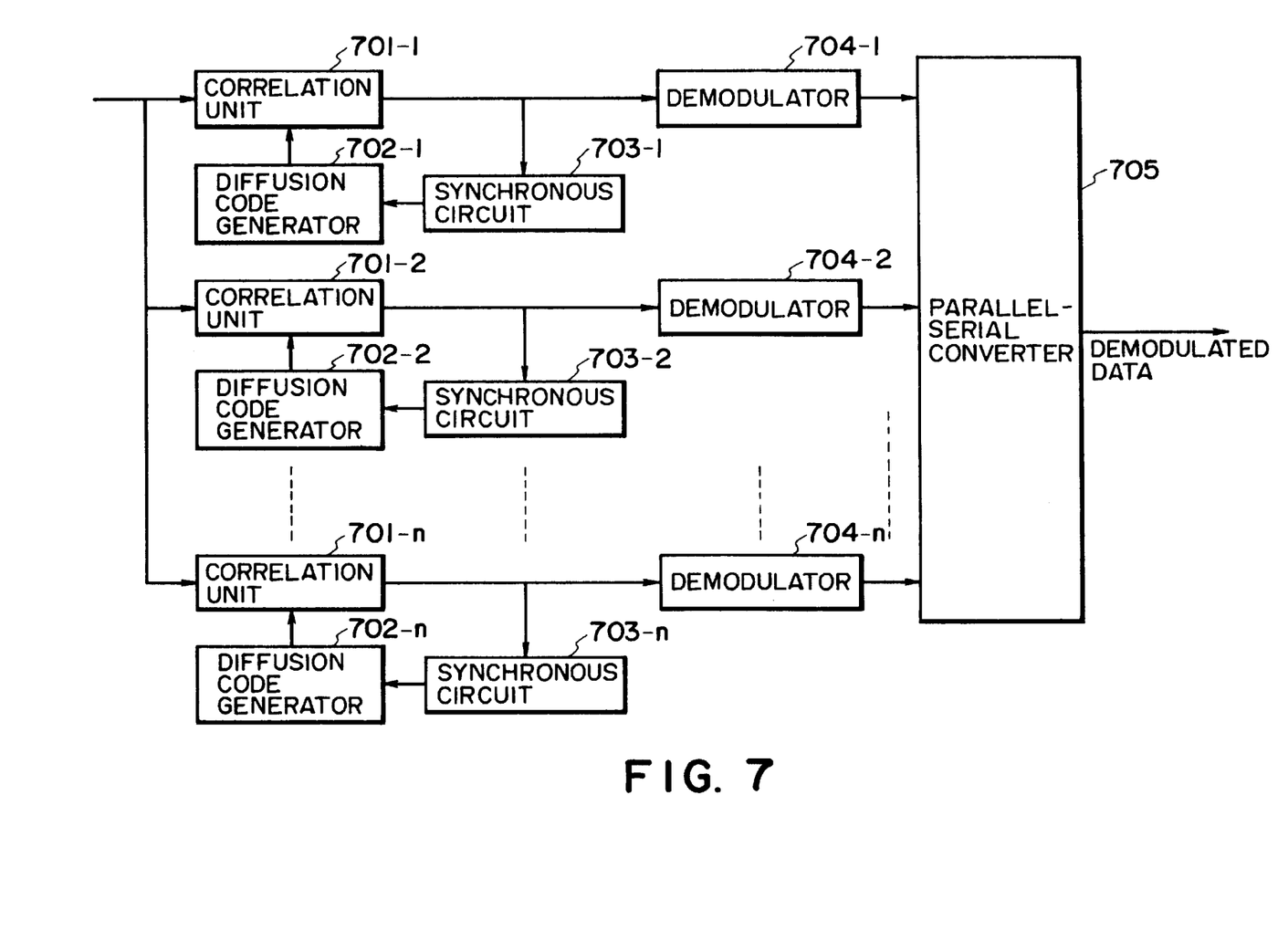
FIG. 7 is a detailed block diagram of a decoder 212 in FIG. 4.

FIG. 7 shows a specific construction of the decoder 212.

In FIG. 7, reference numerals 701-1 to 701-n denote correlation units; 702-1 to 702-n diffusion code generators; 703-1 to 703-n synchronous circuits; 704-1 to 704-n demodulators; and 705 a parallel/serial converter.

The operation of the decoder 212 constructed as mentioned above will now be described.

The data which was properly filtered and amplified and converted into the intermediate frequency signal by the radio receiving unit 110 or 122 is inputted to the decoder 212.

Correlations between the input data and outputs of the diffusion code generators 702-2 to 702-n corresponding to the channels are detected by the correlation units 701-1 to 701-n and an inverse diffusion is performed. In the inverse diffusion, signals are synchronized in every channel by the synchronous circuits 703-1 to 703-n, thereby making the code phases of the diffusion code generators and the clocks coincide. The inverse diffusion signals are demodulated by the demodulators 704-1 to 704-n. The demodulated data is converted into the serial data by the P/S converter 705 and the original information data is reproduced.

The D/S encoder 204 and D/S decoder 209 are controlled by a control unit 206 in accordance with a control signal from the control terminal 208.

Figure 8:
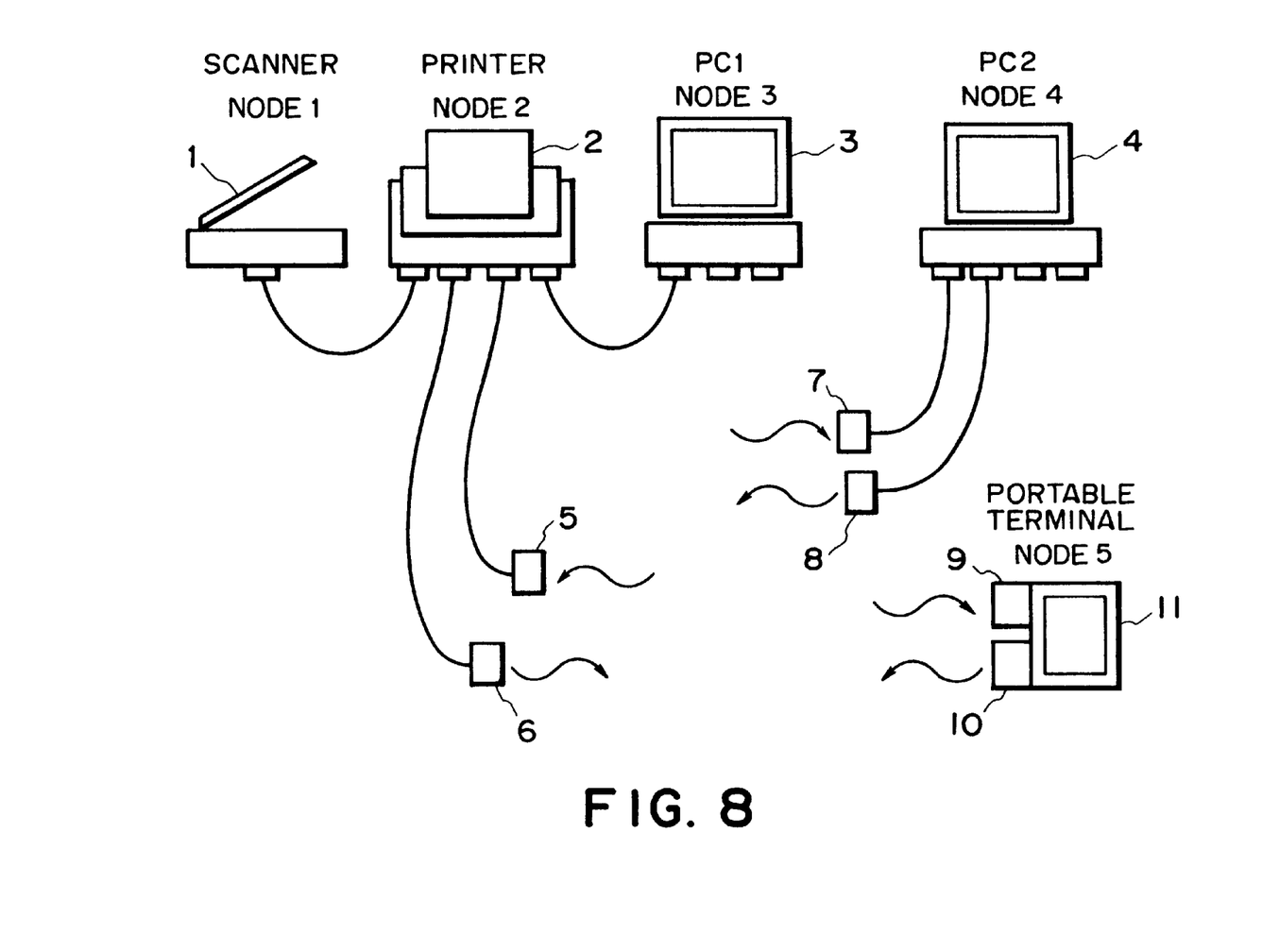
FIG. 8 is a diagram showing a constructional example when the invention is applied to a system to which a plurality of digital information equipment are connected.

FIG. 8 is a diagram showing a constructional example of a system to which five digital information equipments are connected by using the DIF unit in FIG. 4.

In FIG. 8, a scanner 1, a printer 2, a personal computer 3 (PC1), a personal computer 4 (PC2), and a portable terminal 11 are used as five equipments.

It is now assumed that the above five equipments are referred to as nodes 1 to 5. The printer 2 is connected to the scanner 1 and personal computer 3 by wires. The printer 2, personal computer 4, and portable terminal 11 are connected in a radio manner.

Therefore, a radio receiving unit 5 and a radio transmitting unit 6 are provided for the printer 2. A radio receiving unit 7 and a radio transmitting unit 8 are provided for the personal computer 4. Further, a radio receiving unit 9 and a radio transmitting unit 10 are provided for the portable terminal 11. Therefore, the DIF unit is provided for each of the printer 2, personal computer 4, and portable terminal 11.

Each of the equipments is connected by the IEEE 1394 by a wire and all of them conform with the IEEE 1394.

According to the embodiment as mentioned above, a plurality of digital information equipments can be easily connected at a remote distance. Particularly, since the equipment can be connected irrespective of the connecting conditions of the wires among the equipment, a degree of freedom in the system construction is improved.

Since a part of the circuit can be shared by a wire and a radio, when an LSI is formed, circuit construction is simplified, chip area can be reduced, restriction of the hardware decreases, and the costs can be reduced.

In other words, the foregoing description of the embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A communication device comprising:
   a packet processing unit adapted to generate a packet in a predetermined format and to depacketize a packet received by the packet processing unit in a predetermined format;
   a radio communication unit adapted to transmit and to receive a packet in the predetermined format;
   a wire communication unit adapted to transmit and to receive a packet in the predetermined packet format; and
   a selecting unit adapted to provide a packet generated by the packet processing unit to the radio communication unit and to provide a packet received by the radio communication unit to the packet processing unit if the device is in a radio communication mode, and adapted to provide a packet generated by the packet processing unit to the wire communication unit and to provide a packet received by the wire communication unit to the packet processing unit if the device is in a wire communication mode.

2. A device according to claim 1, wherein the wire communication unit is adapted to transmit and to receive the packet using a serial communication.

3. A device according to claim 1, wherein the radio communication unit is adapted to transmit and to receive the packet using a spread spectrum communication.

4. A device according to claim 1, wherein the wire communication unit conforms to IEEE 1394-1995 standard.

5. A method used in a communication device, wherein the device comprises a packet processing unit adapted to generate a packet in a predetermined format and to depacketize a packet received by the packet processing unit in a predetermined format, a radio communication unit adapted to transmit and to receive a packet in the predetermined format, and wire communication unit adapted to transmit and to receive a packet in the predetermined format, the method comprising the steps of:
   if the device is in a radio communication mode, providing a packet generated by the packet processing unit to the radio communication unit and providing a packet received by the radio communication unit to the packet processing unit; and
   if the device is in a wire communication mode, providing a packet generated by the packet processing unit to the wire communication unit and providing a packet received by the wire communication unit to the packet processing unit.

6. A method according to claim 5, wherein the wire communication unit is adapted to receive the packet using a serial communication.

7. A method according to claim 5, wherein the radio communication unit is adapted to transmit and to receive the packet using a spread spectrum communication.

8. A method according to claim 5, wherein the wire communication unit conforms to IEEE 1394-1995 standard.

9. A system for recording encoded image data on a recording medium, the system comprising:
   a packet processing unit adapted to generate a packet in a predetermined format and to depacketize a packet received by the packet processing unit in a predetermined format, including the encoded image data;

a radio communication unit adapted to transmit and to receive a packet in the predetermined format;

a wire communication unit adapted to transmit and to receive a packet in the predetermined format; and a selecting unit adapted to provide a packet generated by the packet processing unit to the radio communication unit and to provide a packet received by the radio communication unit to the packet processing unit if the system is in a radio communication mode, and adapted to provide a packet generated by the packet processing unit to the wire communication unit and to provide a packet received by the wire communication unit to the packet processing unit if the system is in a wire communication mode.

10. A system according to claim 9, wherein the wire communication unit is adapted to transmit and to receive the packet using a serial communication.

11. A system according to claim 9, wherein the radio communication unit is adapted to transmit and to receive the packet using a spread spectrum communication.

12. A system according to claim 9, wherein the wire communication unit conforms to IEEE 1394-1995 standard.

13. A method used in a system for recoding encoded image data on a recording medium, wherein die system comprises a packet processing unit adapted to generate a packet in a predetermined format and to depacketize a packet received by the packet processing unit in a predetermined format including the encoded image data, a radio communication unit adapted to transmit and to receive a packet in the predetermined format, and a wire communication unit adapted to transmit and to receive a packet in the predetermined format, the method comprising the steps of:

if the system is in a radio communication mode, providing a packet generated by the packet processing unit to the radio communication unit and providing a packet received by the radio communication unit to the packet unit; and if the system is in a wire communication mode, providing a packet generated by the packet processing unit to the wire communication unit and providing a packet received by the wire communication unit to the packet processing unit.

14. A method according to claim 13, wherein the wire communication unit is adapted to transmit and to receive the packet using a serial communication.

15. A method according to claim 13, wherein the radio communication unit is adapted to transmit and to receive the packet using a spread spectrum communication.

16. A method according to claim 13, wherein the wire communication unit conforms to IEEE 1394-1995 standard.

* * * * *

UNITED STATES PATENT AND TRADEMARK OFFICE
CERTIFICATE OF CORRECTION

PATENT NO.    : 6,771,936 B2                                                           Page 1 of 1
DATED         : August 3, 2004
INVENTOR(S)   : Hatae It is certified that error appears in the above-identified patent and that said Letters Patent is hereby corrected as shown below:

Title page,
Item [56], References Cited, U.S. PATENT DOCUMENTS, "5/1970 Andersen" should read -- 2/1967 Andersen --.

Column 1,
Line 67, "(step)." should read -- (step). (Paragraph) In another preferred embodiment, a communication device has a packet processing unit adapted to generate a packet in a predetermined format and to depacketize a packet received by the packet processing unit in a predetermined format. A radio communication unit and a wire communication unit are adapted to transmit and to receive a packet in the predetermined format. A selecting unit is adapted to provide a packet generated by the packet processing unit to the radio communication unit and to provide a packet received by the radio communication unit to the packet processing unit if the device is in a radio communication mode, and is adapted to provide a packet generated by the packet processing unit to the wire communication unit and to provide a packet received by the wore communication unit to the packet processing unit if the device is in a wire communication mode.--

Column 6,
Line 14, "packet format;" should read -- format; --; and
Line 55, "to" should read -- to transmit and to --.

Column 7,
Line 24, "die" should read -- the --.

Column 8,
Line 2, "format" should read -- format, --; and
Line 10, "packet" should read -- packet processing --.

Signed and Sealed this

Third Day of May, 2005

JON W. DUDAS
*Director of the United States Patent and Trademark Office*